Feb. 16, 1971  E. W. MERRILL ET AL  3,563,936
PLASTISOL COMPOSITION

Filed May 16, 1968  3 Sheets-Sheet 1

1μ

INVENTORS
EDWARD W. MERRILL
JACOB M. PIKARSKY

William L. Baker
ATTORNEY

1μ

1μ

United States Patent Office 3,563,936
Patented Feb. 16, 1971

3,563,936
PLASTISOL COMPOSITION
Edward W. Merrill, Cambridge, and Jacob M. Pikarsky, Arlington, Mass., assignors to W. R. Grace & Co., Cambridge, Mass., a corporation of Connecticut
Filed May 16, 1968, Ser. No. 729,651
Int. Cl. C08f 29/20, 45/36
U.S. Cl. 260—31.8     14 Claims

ABSTRACT OF THE DISCLOSURE

A plastisol composition containing as the resin component 10 to 50 parts by weight of dispersion grade vinyl chloride polymer and 50 to 90 parts by weight of mass-polymerized vinyl chloride polymer. The amount of plasticizer employed in the composition can range from 50 to 110 parts by weight per hundred parts by weight of the resin component.

---

This invention relates to novel plastisol compositions. More particularly, this invention relates to novel plastisol compositions especially suitable for use in sealing container closures and which contain a blend of certain vinyl chloride resins.

Plastisol compositions have been used in the preparation of films and coatings, rainwear, printing plates, closure gaskets for hermetically sealing glass containers and in the manufacture of a wide variety of other products. Conventionally, plastisol compositions are defined as dispersions of finely divided thermoplastic resin particles in a liquid, non-volatile plasticizer in which the resin is insoluble at room temperature. At elevated temperatures the resin particles are substantially completely solvated by the plasticizer producing a homogeneous solution which is transferred into a rubbery, thermoplastic gel upon cooling.

Vinyl chloride resins have been widely used in plastisol compositions because of certain inherent characteristics. Vinyl chloride resins produced by aqueous emulsion polymerization in particular have been found to be especially advantageous in plastisol compositions. These resins are frequently referred to as dispersion or paste grade resins and are characterized by excellent "stir-in" properties permitting facile dispersion in a liquid plasticizer up to high concentration of resin at room temperature to form a paste-like mixture. Its lack of graviational settling upon storage and its rapid conversion to a gel when heated contribute to the popularity of emulsion-polymerized vinyl chloride resins in plastisol compositions, especially plastisol compositions intended for use as gaskets for sealing container closures.

In emulsion polymerization, the vinyl chloride monomer is emulsified in a medium, generally water, with the aid of emulsifying agents such as soaps, alkyl sulfonates, etc. Usually an initiator for the polymerization reaction such as sodium peroxysulfate is included. The monomer is present almost entirely as emulsion droplets dispersed in the continuous medium. When sufficient soap is added to the water, it exists in the form of micelles. Part of the monomer added to the system enters the micelles, but most of it exists at the beginning and up to 50% conversion in the form of droplets about a micron in diameter stabilized by a portion of the soap. As free radicals are formed in the aqueous phase, they migrate into the miceller monomer phase where polymerization takes place. As the polymer is formed, the micelles grow by the addition of monomer diffusing through the aqueous phase from the monomer droplets. When polymerization is complete, the polymer is recovered by spraying the emulsion into a current of hot air. The resulting polymeric material consists of agglomerates which range in size up to about 5 microns and are composed of individual, generally non-porous spheres having a size of about 0.2 to 0.5 micron. Additional soap is often added prior to spray drying to improve the dispersion charatceristics of the dried resins.

Due to the large content of emulsifier in vinyl chloride resins produced by the emulsion polymerization method, the plastisols formulated using these resins are semi-cloudy in appearance. Moreover, when emoplyed for sealing containers for food and beverages, quantities of emulsifier are frequently released from such resins to the food and beverage, thereby imparting a disagreeable taste to the food or beverage. Further, from a commercial standpoint, emulsion-polymerized vinyl chloride resin is more costly to produce than resins prepared using other polymerization techniques.

The art has recognized that a significant advantage can be gained by admixing less-costly produced suspension-polymerized vinyl chloride resin with emulsion-polymerized resin. The use of blends of suspension-polymerized vinyl chloride resins and emulsion-polymerized vinyl chloride resins in plastisol compositions lowers the overall cost of the blend and the extractable emulsifier content. However, suspension-polymerized vinyl chloride resins often contain traces of suspending agent left over from the polymerization process, and, the suspending agent, like the emulsifier used in emulsion polymerization techniques, may later be extracted into foods or beverages. A further difficulty encountered with plastisol composites unsuitable for such essential commercial oplymerized and suspension-polymerized vinyl chloride resins resides in the fact that such compositions, when employed in molding operations, are found to gel at relatively high temperatures, which temperatures often cause sticking of the composition to the heated dies used in the molding operation. Moreover, there is a limit on the amount of suspension-polymerized vinyl chloride resin which can be employed in, plastisol compositions designed for use in commercial molding operations, since the composition must posses important rheological properties such as fluidity and resistance to settling. Increasing the amount of suspension-polymerized vinyl chloride resin above a certain defined amount at a given platsicizer level usually leads to settled, and often dry, non-fluid composites unsituable for such essential commercial operations as pumping, etc.

A plastisol composition has now been found which employs a blend of emulsion-polymerized or dispersion grade vinyl chloride polymer and vinyl chloride polymer produced by mass polymerization, which blend is characterized by a low emulsifier content, crystal clarity after fluxing, good rheological properties and is capable of being molded and fluxed at relatively low temperatures.

The novel plastisol composition of the invention comprises (a) 100 parts by weight of a vinyl chloride resin component containing 10 to 50, preferably 15 to 25, parts by weight of emulsion-polymerized or dispersion grade vinyl chloride polymer and 50 to 90, preferably 75 to 85 parts by weight of mass-polymerized vinyl chloride polymer and (b) a plasticizer for the vinyl chloride resin component. The amount of plasticizer employed can range between 50 to 110, preferably 80 to 95, parts by weight per hundred parts by weight of the resin component. Mass polymerized vinyl chloride polymers having a specific viscosity at 30° C. (0.4 g./100 ml. in nitrobenzene) of at least 0.30 are preferred in the compositions of the invention since compositions employing such polymers were found to gel relatively faster than compositions containing mass-polymerized vinyl chloride polymers of lower specific viscosity. The rapid gelling of the preferred compositions makes them ideally suited for use in high speed molding operations, for instance, in the molding of container closures wherein a small amount of the composition is deposited in the container closure and gelled by contacting the composition with a heated die. Usually, the closure containing the gelled composition is further heated in an oven to flux the composition. In such high speed operations, the composition is gelled by the die generally in about 2 to 5 seconds.

The term "mass-polymerized vinyl chloride polymer" as used herein and in the claims denotes vinyl chloride resins produced by so called "mass" or "bulk" polymerization processes as opposed to vinyl chloride resins produced by emulsion, suspension or solution polymerization methods. Unlike these latter methods, the only phase initially present in the mass or bulk polymerization technique is the monomer itself in which a small amount of initiator, chain-transfer agent, etc. may be dissolved. The reaction is usually carried out at a temperature of about 30–80° C., and a pressure between about 75 and 175 p.s.i. in an autoclave equipped with suitable cooling means to dissipate the heat evolved by the highly exothermic reaction and agitation means to prevent fusion of the vinyl chloride polymer which being insoluble in the monomer precipitates as a separates solid phase of distinctive structure, described below. Over the course of the reaction, the liquid monomer progressively evolves into a slurry of polymer in monomer, thence into a granular solid containing monomer and capable of being handled by equipment appropriate to sand-like solids.

Vinyl chloride resins produced by mass polymerization exhibits a unique particle structure consisting of aggregates of interpenetrating spheres, each sphere, which is probably an ultimate macromolecule, having a diameter of less than 1000 angstroms, and usually in the range of about 75 to 200 angstroms. The unique structure is evidenced by a comparison of the accompanying group of photomicrographs taken by direct electron microscopy wherein.

Figure 1:
FIG. 1 is a photomicrograph ($\times 14000$) of a sample of a mass-polymerized polyvinyl chloride homopolymer having a specific viscosity at 30° C. (0.4 g./100 ml. in nitrobenzene) of 0.34 and an average bulk density of 32.3 lbs./ft.$^3$.
Figure 2:
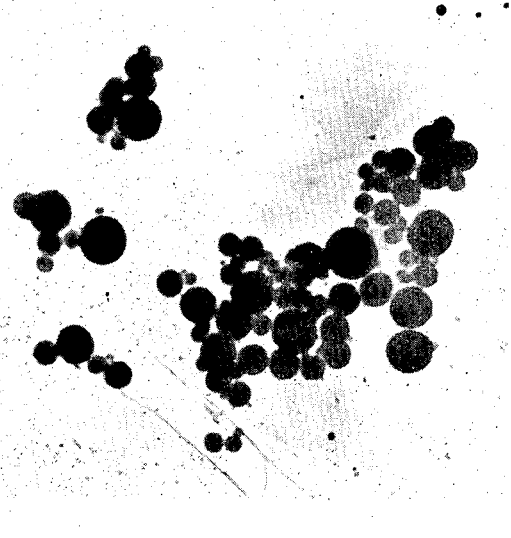
FIG. 2 is a photomicrograph ($\times 14000$) of a sample of a polyvinyl chloride homopolymer prepared by emulsion polymerization having an inherent viscosity of 1.12.
Figure 3:
FIG. 3 is a photomicrograph ($\times 14000$) of a sample of a polyvinyl chloride homopolymer prepared by suspension polymerization having an inherent viscosity of 1.03.

In contradistinction to the aggregates of interpenetrating spheres having a diameter in the aforementioned range, suspension polymerized vinyl chloride resin shows an irregularly-spherical structural unit considerably larger than 1000 angstroms in diameter, these units being parts of much greater particles. Direct electron microscopy of vinyl chloride resins produced by emulsion polymerization shows such resins to be composed of separate, perfect spheres having a diameter of from about 1000 angstroms to two microns or more. It is believed that the unique microscopic structure evidenced by microscopic examination accounts for the highly desirable characteristics of the blends of the invention.

The term "vinyl chloride polymer" as used herein and in the claims includes homopolymers and copolymers of vinyl chloride with monomeric materials capable of copolymerization with the vinyl chloride monomer. Suitable copolymers, for example, include a major amount of vinyl chloride copolymerized with up to about 20% by weight of vinyl acetate. Other monomers often copolymerized with vinyl chloride include acrylonitrile, vinylidene chloride, and dialkyl maleates.

The plasticizer employed in the blend of the invention should be capable of dissolving the vinyl chloride resin when heated and remain completely compatible with the resin upon cooling. Illustrative plasticizers include dialkyl phthalates such as dioctyl phthalate (di-2-ethyl hexyl phthalate) and octyl decyl phthalate, alkyl phthalyl alkyl glycolates, such as ethyl phthalyl ethyl glycolate and butyl phthalyl butyl glycolate, dialkyl esters of alkane dicarboxylic acids, such as diisobutyl adipate and dibutyl sebacate; acetyl trialkyl citrates, such as acetyl tributyl citrate; and trialkyl and triaryl phosphates, such as trioctyl phosphate and tricresyl phosphate. Other useful plasticizers include alkyl esters of fatty acids such as octyl stearate; epoxidized triglycerides such as epoxidized soybean oil and polymeric polyester plasticizers such as polymeric glycol adipate. The preferred plasticizers are di-2-ethylhexyl phthalate and diisodecyl phthalate.

It has been found advantageous to include about 0.15 to 3, preferably .5 to 1, weight percent, based on the total weight of the vinyl chloride resin and plasticizer components, of a siliceous thickening agent in the blend of the invention to prevent "packing" of the resin component over extended periods of time, for instance, over about 14 days. An especially desirable blend exhibiting excellent stability over relatively longer periods of time comprises 80 parts by weight of mass-polymerized vinyl chloride resin, 20 parts by weights of emulsion-polymerized vinyl chloride resin and 90 parts by weight of plasticizer.

Suitable siliceous thickening agents contain at least one silicon-oxygen bond and include such materials as the alkali metal silicates, e.g., sodium silicate, alkaline earth metal silicates, e.g., calcium silicate, talc, etc. Colloidal silica provides the best results and is the preferred thickening agent in the blends of the invention.

Other conventional additives may be included in the composition of the invention in small amounts, e.g. up to about 20 volume percent, provided that such do not deleteriously affect the characteristics of the composition. Exemplary of such materials are fillers such as wood flour and asbestos; stabilizers, such as tetrasodium pyrophosphate, pigments such as carbon black, titanium dioxide, etc.

The blends of the invention can be foamed using conventional foaming methods and blowing agents. Exemplary blowing agents suitable for use in the present invention are azo compounds, such as diazoaminobenzene and azobisisobutylronitrile; N-nitroso-compounds such as N,N'-di-methyl-N,N'-dinitroso-terephthalamide; sulfonyl hydrazides such as 4,4'-oxybis(benzenesulfonyl hydrazide), etc. Azodicarbonamide is the preferred blowing agent in the blends of the invention.

The invention is further illustrated by the following non-limiting examples:

EXAMPLE I

Several plastisol compositions were formulated using various amounts of vinyl chloride resins prepared by emulsion polymerization, suspension polymerization and mass polymerization techniques. The compositions are designated A–M and are listed in Table I. Compositions A, B, E, F, G and N are blends made according to the present invention.

The rheology of the compositions was noted and the compositions tested for moldability. The results are listed in Table I. A good rheology (reported as (G) in the table) indicates a fluid, slightly pasty composition which will flow through an orifice under pressure and will not tend to form a "plug," i.e. filter the plasticizer out of the composition. A poor rheology (P) signifies a dry and dilatant composition while compositions having a very poor rheology (VP) are lumpy and useless.

The moldability test determines the temperature in degrees Fahrenheit at which a sample of the composition takes a definite, precise shape in five seconds under pressure forming a coherent network of partially swollen particles, though the composition is not yet at its final, fluxed state of complete and uniform admixture.

TABLE I

| Composition, parts by wt. | A | B | C | D | E | F | G | H | I | J | K | L | M | N |
|---|---|---|---|---|---|---|---|---|---|---|---|---|---|---|
| Mass-polymerized PVC [1] | 60 | 60 | | | 80 | 80 | 75 | | | | | | | 80 |
| Emulsion-polymerized PVC [2] | | | | | 20 | 25 | 20 | 20 | 25 | 20 | 20 | 20 | 20 | 20 |
| Do.[3] | 40 | | 40 | 40 | 20 | | | | | | | | | |
| Do.[4] | | 40 | | | | | | | | | | | | |
| Suspension-polymerized PVC [5] | | | 60 | | | | | 80 | 80 | 75 | | | | |
| Do.[6] | | | | 60 | | | | | | | | | | |
| Do.[7] | | | | | | | | | | | 80 | | | |
| Do.[8] | | | | | | | | | | | | 80 | | |
| Do.[9] | | | | | | | | | | | | | 80 | |
| Di-2-ethyl-hexyl phthalate | 70 | 70 | 70 | 70 | 90 | | | 90 | 100 | 90 | 80 | 80 | 80 | 80 |
| Di-isodecyl phthalate | | | | | | 90 | 90 | | | | | | | |
| Silica | | | | | 1 | 1 | | .95 | 1 | .95 | .90 | .90 | .90 | .90 |
| Microcelle E [10] | | | | | | | 5 | | | | | | | |
| Rheology | G | G | P | P | G | G | G | VP | P | P | P | P | P | G |
| Moldability | (*) | (*) | | | 260° | 240° | | | | | 280 | 285–295 | 280–300 | 240 |

[1] Homopolymer having a specific viscosity at 30° C. (0.4 g./100 ml. in nitrobenzene) of 0.34 and an avg. bulk density of 32.3 lbs./ft.[3].
[2] Plastisol grade homopolymer having an inherent viscosity of 1.12.
[3] Homopolymer having an inherent viscosity of 1.4 and an avg. bulk density of 17 lbs./ft.[3].
[4] Homopolymer having an inherent viscosity of 1.7.
[5] Homopolymer having a specific viscosity at 30° C. (0.4 g./100 ml. in nitrobenzene) of 0.48–0.52, bulk density of 20 lbs./ft.[3] and an inherent viscosity of 1.03.
[6] Homopolymer having an avg. bulk density of 27 lbs./ft.[3].
[7] Homopolymer having an avg. inherent viscosity of 1.15 and a bulk density of 44 lbs./ft.[3].
[8] Homopolymer having an avg. inherent viscosity of 0.86 and a bulk density of 44 lbs./ft.[3].
[9] Homopolymer having a relative viscosity at 25° C. (1% sol in cyclohexanone) of 2.10 and a bulk density of 0.50 g./ml.
[10] Finely divided hydrated synthetic calcium silicate.
* High-speed molded at a temperature of about 320° F. in 2 seconds.

An examination of the data presented in Table I shows that the plastisol blends of the invention which contain as the resin component a mixture of a relatively high amount of mass-polymerized vinyl chloride with emulsion-polymerized vinyl chloride, not only possess the desired rheological properties but also can be molded at temperatures lower than resin blends using equivalent amounts of suspension-polymerized vinyl chloride resins. Compositions C, D, H, I and J which contained as the resin component a mixture of emulsion-polymerized vinyl chloride polymer and varying amounts of suspension-polymerized vinyl chloride polymer had rheologies so poor that they could not be molded. Compositions K, L and M possessed rheologies which were not as good as the compositions of the invention (A, B, E, F, G and N), but could be molded. However, these compositions required temperatures of from 40 to 60 degrees higher in order to be molded in 5 seconds. Compositions A and B could be molded in 2 seconds at a temperature of about 320° F., demonstrating suitability for high speed molding operations.

EXAMPLE II

A plastisol composition containing the following components was formulated according to the present invention:

| | Parts (wt.) |
|---|---|
| Mass-polymerized PVC [1] | 60 |
| Emulsion-polymerized PVC [2] | 40 |
| Di-2-ethylhexyl phthalate | 53.3 |
| Azodicarbonamide | 0.7 |
| Lubricant | 8.5 |
| Calcium-zinc stabilizer | 1 |
| Calcium-zinc stabilizer | 1 |

[1] Homopolymer having a specific viscosity at 30° C. (0.4 g./100 ml. in nitrobenzene) of 0.41 and an av. bulk density of 30 lbs./ft.[3].
[2] Homopolymer having an inherent viscosity of 1.4 and an av. bulk density of 17 lbs./ft.[3].

The composition was high-speed molded by contacting a small sample of the composition with a heated die at 320° F. in about 0.5 to 5 seconds and advantageously an excellent foamed material was produced in a single operation by continued heating to about 400° F.

Any departure from the foregoing description conforming to the present invention is intended to be included within the scope of the appended claims.

It is claimed:

1. A plastisol composition comprising (a) 100 parts by weight of a vinyl chloride resin component containing 10 to 50 parts by weight of dispersion grade vinyl chloride homopolymer or copolymer thereof containing up to about 20 weight percent of ethylenically unsaturated comonomer copolymerizable therewith and 50 to 90 parts by weight of mass-polymerized vinyl chloride homopolymer or copolymer thereof containing up to about 20 weight percent of ethylenically unsaturated comonomer copolymerizable therewith, and (b) a plasticizer for said resin component.

2. The plastisol composition of claim 1 wherein the plasticizer is present in an amount of 50 to 110 parts by weight per hundred parts by weight of said resin component.

3. The plastisol composition of claim 1 additionally containing about 0.15 to 3 weight percent, based on the total weight of said resin component and said plasticizer, of a siliceous material.

4. The plastisol composition of claim 1 wherein said mass-polymerized vinyl chloride polymer has a particle structure consisting of aggregates of interpenetrating spheres, said spheres having a diameter of less than 1000 angstroms.

5. The composition of claim 4 wherein said polymer is a homopolymer of vinyl chloride.

6. The composition of claim 1 wherein said mass-polymerized vinyl chloride polymer has a specific viscosity at 30° C. (0.4 g./100 ml. in nitrobenzene) of at least 0.30.

7. A plastisol composition comprising (a) 100 parts by weight of a vinyl chloride resin component containing 10 to 50 parts by weight of emulsion-polymerized vinyl chloride homopolymer or copolymer thereof containing up to about 20 weight percent of ethylenically unsaturated comonomer copolymerizable therewith and 50 to 90 parts by weight of mass polymerized vinyl chloride homopolymer or copolymer thereof containing up to about 20 weight percent of ethylenically unsaturated comonomer copolymerizable therewith; (b) about 50 to 110 parts by weight per hundred parts of said resin component of a plasticizer; and (c) about 0.15 to 3 weight percent, based on the total weight of said resin component and plasticizer, of a siliceous thickening agent.

8. The composition of claim 7 wherein said mass-polymerized vinyl chloride polymer has a particle structure consisting of aggregates of interpenetrating spheres, said spheres having a diameter of less than 1000 angstroms.

9. The composition of claim 8 wherein said spheres have a diameter in the range of about 75 to 200 angstroms.

10. The composition of claim 7 wherein the plasticizer is di-2-ethylhexyl phthalate.

11. The composition of claim 7 wherein the plasticizer is di-isodecyl phthalate.

12. The composition of claim 7 wherein said siliceous material is colloidal silica.

13. The composition of claim 7 wherein said mass-polymerized vinyl chloride polymer has a specific viscosity at 30° C. (0.4 g./100 ml. in nitrobenzene) of at least 0.30.

14. A plastisol composition comprising (a) 100 parts of a vinyl chloride resin component containing 15 to 25 parts by weight of dispersion grade vinyl chloride homopolymer or copolymer thereof containing up to about 20 weight percent of ethylenically unsaturated comonomer copolymerizable therewith and 75 to 85 parts by weight of mass-polymerized vinyl chloride homopolymer or copolymer thereof containing up to about 20 weight percent of ethylenically unsaturated comonomer copolymerizable therewith having a particle structure consisting of interpenetrating spheres having a diameter of less than 1000 angstroms and a specific viscosity at 30° C. (0.4 g./100 ml. in nitrobenzene) of at least 0.30, (b) about 75 to 85 parts by weight of a plasticizer per hundred parts by weight of said resin component and (c) about 0.5 to 1 weight percent, based on the total weight of said resin component and plasticizer, of a siliceous material.

References Cited

UNITED STATES PATENTS

| | | | |
|---|---|---|---|
| 2,868,763 | 1/1959 | Montgomery | 260—899 |
| 3,287,447 | 11/1966 | Faure | 260—899 |
| 3,318,825 | 5/1967 | Enk et al. | 260—899 |

MORRIS LIEBMAN, Primary Examiner

L. T. JACOBS, Assistant Examiner

U.S. Cl. X.R.

260—41, 899